US010904007B2

(12) United States Patent
Kim et al.

(10) Patent No.: US 10,904,007 B2
(45) Date of Patent: Jan. 26, 2021

(54) AUTHENTICATION DEVICE BASED ON BIOMETRIC INFORMATION, CONTROL SERVER CONNECTED TO THE SAME, AND LOGIN METHOD BASED ON BIOMETRIC INFORMATION THEREOF

(71) Applicant: KT Corporation, Seongnam-si (KR)

(72) Inventors: Tae-Gyun Kim, Seongnam-si (KR); Daesung Cho, Seoul (KR); In-Soo Lee, Yongin-si (KR); Deok-Moon Chang, Seoul (KR)

(73) Assignee: KT Corporation, Seongnam-si (KR)

( * ) Notice: Subject to any disclaimer, the term of this patent is extended or adjusted under 35 U.S.C. 154(b) by 164 days.

(21) Appl. No.: 16/065,357

(22) PCT Filed: Dec. 14, 2016

(86) PCT No.: PCT/KR2016/014628
§ 371 (c)(1),
(2) Date: Nov. 15, 2018

(87) PCT Pub. No.: WO2017/111383
PCT Pub. Date: Jun. 29, 2017

(65) Prior Publication Data
US 2019/0123907 A1    Apr. 25, 2019

(30) Foreign Application Priority Data

Dec. 23, 2015  (KR) .................. 10-2015-0185450

(51) Int. Cl.
*H04L 9/32* (2006.01)
*G06K 9/00* (2006.01)
(Continued)

(52) U.S. Cl.
CPC .............. *H04L 9/3231* (2013.01); *G06K 9/00* (2013.01); *G06K 9/00087* (2013.01); *H04L 9/08* (2013.01);
(Continued)

(58) Field of Classification Search
CPC . H04L 9/3231; H04L 9/32; H04L 9/08; H04L 63/0861; H04L 9/30; H04L 9/0866;
(Continued)

(56) References Cited

U.S. PATENT DOCUMENTS 7,380,120 B1 * 5/2008 Garcia ................ G06F 21/6209
713/160
8,065,713 B1 * 11/2011 Vainstein .............. H04L 63/102
726/2
(Continued)

FOREIGN PATENT DOCUMENTS

KR    10-0544217 B1    1/2006
KR    10-0941321 B1    2/2010
(Continued)

OTHER PUBLICATIONS

International Search Report for PCT/KR2016/014628 dated Mar. 16, 2017 [PCT/ISA/210].

*Primary Examiner* — David J Pearson
*Assistant Examiner* — Badri Champakesan
(74) *Attorney, Agent, or Firm* — Sughrue Mion, PLLC (57) ABSTRACT

A method of providing a login to website requested from a computing device, by a biometric information based authentication device which interworks with a control server, is provided. The method includes detecting a login request message transmitted from the computing device to a website server providing the website, extracting login session information from the login request message, outputting an authentication result with respect to received biometric
(Continued)

information, and transmitting authentication information comprising the login session information and the authentication result to the control server. The login session information is transmitted from the control server to the website server to determine, by the website server, the login allowance of the website.

16 Claims, 6 Drawing Sheets

(51) Int. Cl.
  *H04L 9/08* (2006.01)
  *H04L 9/30* (2006.01)
  *H04L 29/06* (2006.01)
(52) U.S. Cl.
  CPC .............. *H04L 9/0866* (2013.01); *H04L 9/30* (2013.01); *H04L 9/32* (2013.01); *H04L 63/0861* (2013.01)
(58) Field of Classification Search
  CPC ....... H04L 9/321; H04L 9/0822; H04L 9/302; G06K 9/00; G06K 9/00087; G06K 9/00006; G06K 9/00885
  USPC .......................................................... 713/186
  See application file for complete search history.

(56) References Cited

U.S. PATENT DOCUMENTS

| | | | | |
|---|---|---|---|---|
| 8,589,440 | B1* | 11/2013 | Chaganti | H04L 67/306 707/783 |
| 2007/0245152 | A1* | 10/2007 | Pizano | H04L 9/3213 713/186 |
| 2009/0100269 | A1* | 4/2009 | Naccache | H04L 63/0861 713/186 |
| 2009/0216795 | A1* | 8/2009 | Cohen | H04L 63/1416 |
| 2009/0271496 | A1* | 10/2009 | Nakamura | G06F 16/903 709/217 |
| 2011/0001607 | A1* | 1/2011 | Kamakura | G06K 9/00087 340/5.82 |
| 2011/0012711 | A1* | 1/2011 | Abe | G06Q 20/40145 340/5.82 |
| 2012/0191615 | A1* | 7/2012 | Schibuk | H04L 9/3239 705/75 |
| 2013/0263264 | A1* | 10/2013 | Klein | G06F 21/552 726/23 |
| 2013/0276131 | A1* | 10/2013 | Bjones | G06Q 30/04 726/26 |
| 2014/0176301 | A1* | 6/2014 | Fernandez Banares | G07C 9/21 340/5.26 |
| 2014/0281567 | A1* | 9/2014 | Rane | G06F 21/32 713/186 |
| 2014/0289831 | A1* | 9/2014 | Prakash | H04L 63/0876 726/7 |
| 2015/0025976 | A1* | 1/2015 | Guo | H04W 28/0215 705/14.64 |
| 2015/0169864 | A1* | 6/2015 | Lin | G06F 21/45 726/6 |
| 2015/0188925 | A1* | 7/2015 | Gupta | H04L 63/0861 726/4 |
| 2016/0066183 | A1* | 3/2016 | Conant | G06F 21/602 726/6 |
| 2016/0196432 | A1* | 7/2016 | Main | G06F 8/61 726/1 |
| 2016/0204936 | A1* | 7/2016 | Sakemi | G06F 21/6227 380/28 |
| 2016/0277382 | A1* | 9/2016 | Streuter | H04L 63/102 |
| 2016/0315936 | A1* | 10/2016 | Berini | G06F 21/32 |
| 2018/0218137 | A1* | 8/2018 | Park | H04M 1/673 |

FOREIGN PATENT DOCUMENTS

| | | |
|---|---|---|
| KR | 10-0998241 B1 | 12/2010 |
| KR | 10-2011-0059963 A | 6/2011 |
| KR | 10-2014-0085295 A | 7/2014 |
| KR | 10-2015-0082909 A | 7/2015 |
| KR | 10-2015-0083334 A | 7/2015 |

* cited by examiner

AUTHENTICATION DEVICE BASED ON BIOMETRIC INFORMATION, CONTROL SERVER CONNECTED TO THE SAME, AND LOGIN METHOD BASED ON BIOMETRIC INFORMATION THEREOF

This Application is a National Stage of International Application No. PCT/KR2016/014628 filed Dec. 14, 2016, claiming priority based on Korean Patent Application No. 10-2015-0185450 filed Dec. 23, 2015.

TECHNICAL FIELD

Methods and apparatuses consistent with exemplary embodiments broadly relate to a bio information-based authentication.

BACKGROUND ART

A website determines a login method for user authentication to request a login to a user. An existing login method includes a method of using identification (ID) and a password registered when a user subscribes in a website, or a method of using a certified certificate, or a method of using a number of a portable terminal number of a user who is subscribed in a communication company.

However, the possibility of an exposure of the ID and password based login is high due to hacking and the like, and the user should inconveniently memorize IDs and passwords for each of the websites. Since only terminals storing a certified certificate can use a certified certificate based login, an environment allowing a user to login a certified certificate is restrictive. Further, in the login through a portable terminal number of the user, the user should inconveniently input the portable terminal number of the user to request an authentication number, and again input a received authentication number.

Meanwhile, unique biometric information of the user is registered for a website, the user may be authenticated according to the biometric information or the matching of the biometric information. However, the website should implement various programs for individually inputting biometric information and performing authentication processing for the biometric information based login, and should mange unique information of the authentication. Furthermore, since the website should be configured with a biometric information sensor only for the login of the user, it is difficult to substantially activate the biometric information based login.

DISCLOSURE

Technical Problem

The present disclosure has been made in an effort to provide a biometric information based authentication device, a control server in connection therewith, and a biometric information based login method.

Technical Solution

An exemplary embodiment provides a method of providing a login to website requested from a computing device, by a biometric information based authentication device which interworks with a control server. The method includes detecting a login request message transmitted from the computing device to a website server providing the website, extracting login session information from the login request message, outputting an authentication result with respect to received biometric information, and transmitting authentication information comprising the login session information and the authentication result to the control server. The login session information is transmitted from the control server to the website server to determine, by the website server, the login allowance of the website.

The login method may further include receiving a white list comprising information about a plurality of websites with biometric information login, from the control server. The extracting the login session information may include determining whether the website server is included in the white list based on the login request message, and extracting a session key included in the login request message as the login session information in response to determining that the website server is included in the white list.

The login session information may include the session key and identification information of the website. The identification information of the website may be included in the white list.

The login method may further include activating a sensor in response to the determining that the website server is included in the white list.

The outputting the authentication result may include comparing the received biometric information with stored biometric information, to output the authentication result.

The transmitting the authentication information to the control server may include encrypting the authentication information with a private key to transmit the authentication information to the control server. The control server may store a public key which corresponds to the private key. The public key and the private key may be generated when the authentication device is registered.

The login method may further include registering the authentication device before the detecting the login request message. The registering the authentication device may include detecting first identification information transmitted to the control server from the computing device, determining whether the first identification information corresponds to identification information of the authentication device, activating a sensor when the first identification information corresponds to identification information of the authentication device, registering the biometric information received from the sensor, and generating a public key and a private key based on a key generation algorithm.

Another embodiment of the present disclosure provides a method of providing a login to website requested from a computing device, by a control server which interworks with a biometric information based authentication device. The method includes transmitting a white list comprising information about a plurality of websites with biometric information login to the authentication device, receiving authentication information comprising login session information and a biometric information authentication result from the authentication device, and requesting login with respect to the login session information to a website server associated with the login session information.

The login session information may include the session key and identification information of the website. The session key may be a value identifying a session between the computing device and the website server. The website may be included in the white list.

The requesting the login may include determining authenticity of the authentication information, locating the website server corresponding to the identification information of the website included in the authentication information from the white list in response to the authentication information being authentic and the biometric information authentication result being successful, and requesting the login with respect to the session key to the website server.

The login method may further include storing a public key received from the authentication device. The determining the authenticity of the authentication information may include decoding the authentication information using the public key to determine the authenticity of the authentication information based on a decoding result. The authentication information may be encrypted with a private key which corresponds to the public key.

Yet another embodiment of the present disclosure provides a biometric information based authentication device. The authentication device includes a storage which stores registered biometric information, an authentication key generator which generates a public key and a private key based on a key generation algorithm, and transmits the public key to a control server, and a login controller which detects a login request message transmitted from the computing device to a website server, and transmits authentication information comprising a login session information and a biometric information authentication result extracted from the login request message. The biometric information authentication result may be obtained by comparing the registered biometric information and biometric information acquired after detecting the login request message.

The login controller may receive a white list comprising information about a plurality of websites with biometric information login, from the control server, determine whether the website server is included in the white list based on the login request message, and transmit the authentication information to the control server in response to determining that the website server is included in the white list.

The login controller may parse a session key included in the login request message in response to determining that the website server is included in the white list, and generate the login session information comprising the session key.

The login controller may confirm identification information of the website server in response to determining that the website server is included in the white list, and generate the login session information further comprising the identification information of the website server.

The login controller may activate a biometric information detecting sensor in response to determining that the website server is included in the white list, and receive the biometric information from the sensor.

The login controller may encrypt the authentication information with the private key, and transmit the encrypted authentication information to the control server.

Yet another embodiment of the present disclosure provides a biometric information based authentication device. The authentication device includes at least one sensor which recognizes biometric information, at least one communication interface configured to communicate with a plurality of external devices, a memory which stores a program, a security module which encrypts input data and outputs the encrypted input data, and a processor which interworks with the sensor, the communication interface, the memory, and the security module to execute a plurality of operations of the program. The program includes a first program for information based login. The first program includes instructions for detecting a login request message transmitted from a computing device to a website server, determining whether the website server is included in a white list to activate the sensor, and transmitting, to a control server, a authentication result of first biometric information received from the sensor and login session information extracted from the login request message. The white list includes information of about a plurality of websites with biometric information login received from the control server. The login session information includes a session key and identification information of the website server. The session key is a value identifying a session between the computing device and the website server.

The program may include a second program for registering the authentication device. The second program may include instructions for detecting first identification information transmitted from the computer device to the control server, determining whether the first identification information corresponds to identification information of the authentication device to activate the sensor, registering second biometric information received from the sensor, generating a public key and a private key based on a key generation algorithm to transmit the public key to the control server, encrypting the private key using the security module and storing the encrypted private key.

The first program may further include instructions for comparing the first biometric information with the second biometric information to obtain the biometric information authentication result, decoding the private key, encrypting the biometric information authentication result and the login session information with the private key, and transmitting, to the control server, the encrypted biometric information authentication result and the encrypted login session information.

Advantageous Effects

According to an exemplary embodiment of the present disclosure, a user may easily login to various websites through a biometric information based authentication device of the user. According to an exemplary embodiment of the present disclosure, since a website server permits login based on a login permission request received from a network in connection with the biometric information based authentication device, it is unnecessary to implement a separate program of the biometric information based login, and an ID theft problem due to hacking and the like may be solved.

MODE FOR INVENTION

In the following detailed description, only certain exemplary embodiments have been shown and described, simply by way of an illustration. As those skilled in the art would realize, the described exemplary embodiments may be modified in various different ways, all without departing from the spirit or scope of the present disclosure. Accordingly, the drawings and description are to be regarded as illustrative in nature and not restrictive. Same reference numerals designate like elements throughout the present disclosure.

In the present disclosure, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Biometric information used for authentication may be various different types, such as a fingerprint, an iris, a vein, and so on. Hereinafter, for description, a fingerprint is used as an example, but the biometric information used in the present disclosure is not limited to the fingerprint. Further, according to an exemplary embodiment, a plurality of biometric information can be combined and used for the authentication.

Figure 1:
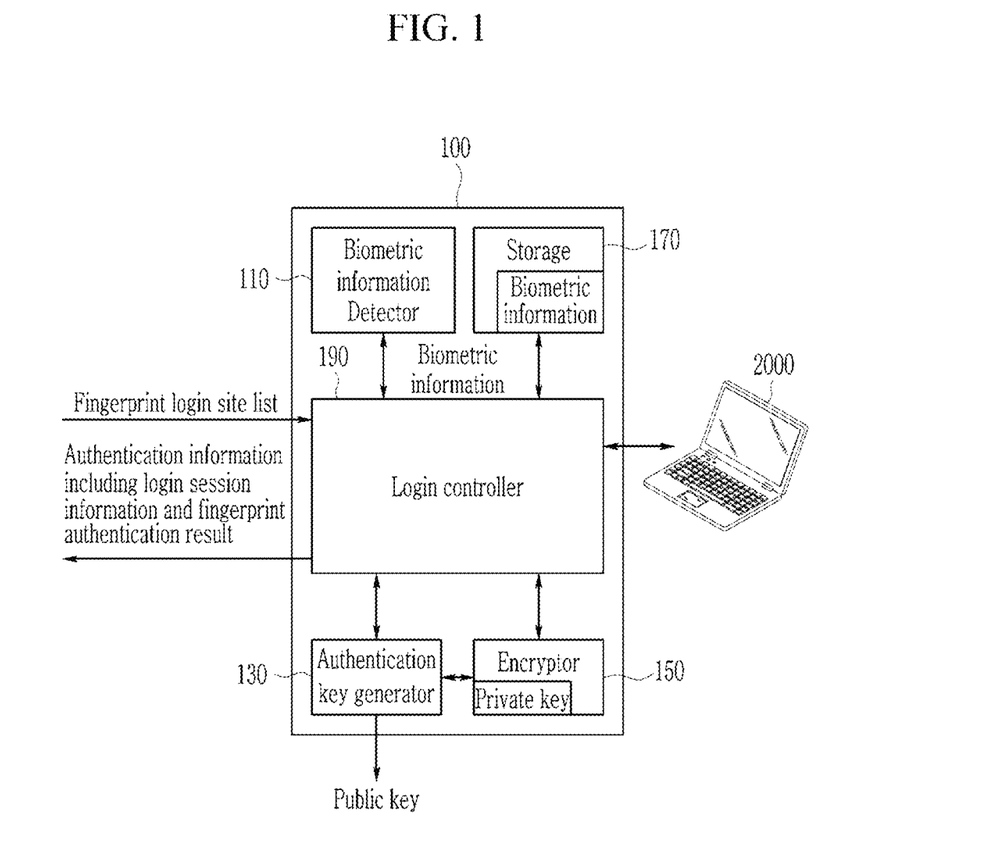
FIG. 1 is a block diagram illustrating an authentication device according to an exemplary embodiment.
Figure 2:
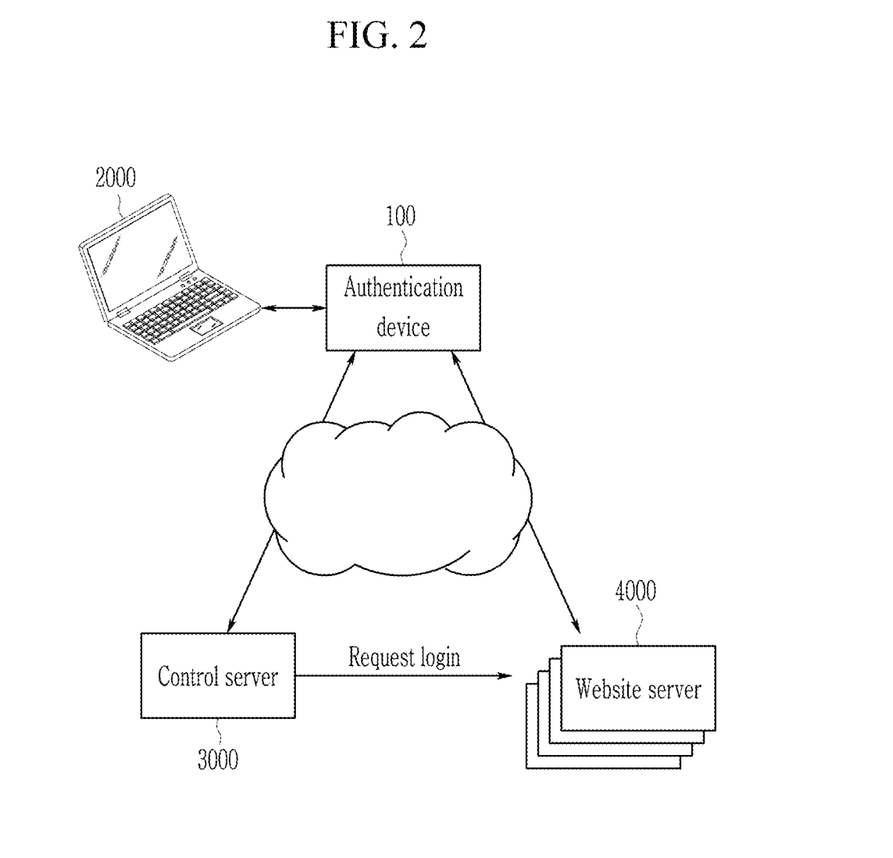
FIG. 2 is a block diagram illustrating a system in which the authentication device is connected with other devices according to an exemplary embodiment.
Figure 3:
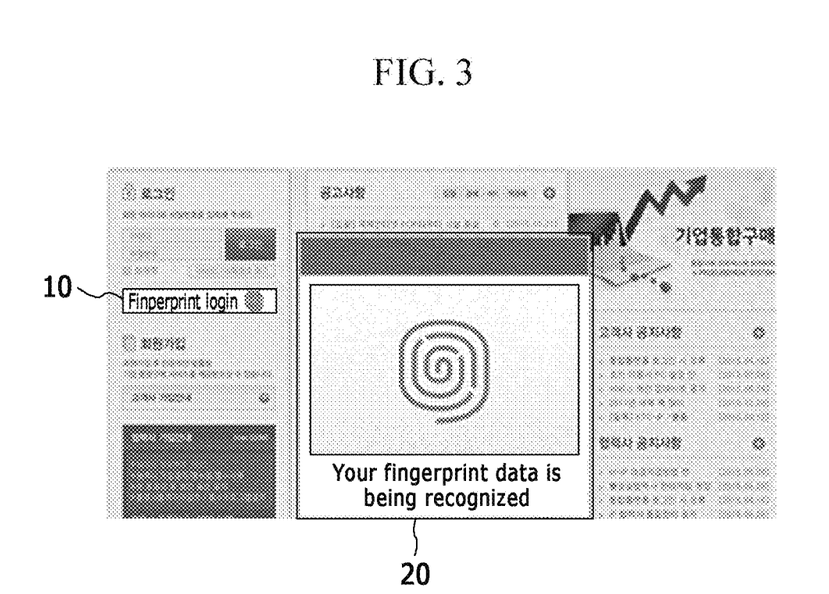
FIG. 3 is a view illustrating a fingerprint login method according to an exemplary embodiment.

FIG. 1 is a block diagram illustrating an authentication device according to an exemplary embodiment. FIG. 2 is a block diagram illustrating a system of the authentication device being connected with other devices according to an exemplary embodiment, and FIG. 3 is a view illustrating a fingerprint login method according to an exemplary embodiment.

Referring to FIG. 1 and FIG. 2, the authentication device 100 is a hardware security device including a processor (CPU) and an operating system (OS). When the authentication device 100 is connected to a computing device 2000, the authentication device is booted with supplied electricity and operates as an independent system from the computing device 2000. Further, when the authentication device 100 is connected to the computing device 2000, the authentication device 100 may disable some functions of the computing device 2000 and enable only internal functions of the authentication device 100.

Referring to FIG. 2, the authentication device 100 may be connected with the computing device 2000 through a communication interface (not shown). The communication interface may include one selected from various wired/wireless interfaces. For example, the communication interface may include a USB interface. However, the communication interface may include another communication interface connected with the computing device 2000. Further, the authentication device 100 may include a plurality of communication interfaces.

Moreover, the authentication device 100 may include a direct communication network connectable communication interface (not shown), that is, a communication module, and may connect with various network devices through the communication module. The network includes a control server 3000 and a plurality of website servers 4000. The communication module may include at least one selected from various communication modules which may connect with a wired/wireless network. For example, the communication module may include a wireless communication module capable of accessing an access point such as a Bluetooth in a wireless scheme or a Wi-fi, or a wired communication module capable of accessing the access point by a wired cable. Meanwhile, if the authentication device 100 is connected with the computing device 2000, a communication module for Internet connection of the computing device 2000 is deactivated, and the authentication device 100 may access an external communication network by only a communication module of the authentication device 100. Next, if the authentication device 100 is connected with the computing device 2000, a communication module for Internet connection of the computing device 2000 is deactivated, and the authentication device 100 accesses an external communication network by only a communication module of the authentication device 100. A packet output from the computing device 2000 or a packet input to the computing device 2000 is transmitted through the authentication device 100. Accordingly, the authentication device 100 may detect the packets output from the computing device 2000 or the packets input to the computing device 2000 and checks contents (message) of the packet.

Referring back to FIG. 1, the authentication device 100 includes a biometric information detector 110, an authentication key generator 130, an encryptor 150, storage 170, and a login controller 190.

The biometric information detector 110 is a sensor which detects, recognizes, or senses biometric information of a user. The biometric information detector 110 is automatically activated when the authentication device 100 is supplied with electricity to be booted or the biometric information detector 110 may be activated by receiving a control signal from a controller (processor) of the authentication device 100. The biometric information detector 110 has unique sensor identification information (sensor_id). Serial information of the sensor may be used as the sensor identification information, but is not limited thereto. Hereinafter, a fingerprint will be described as an example of the biometric information. The biometric information detector 110 stores sensed fingerprint information in the storage 170.

The authentication key generator 130 registers (stores) fingerprint information in an authentication information registration operation to generate a public key and a private key. The authentication key generator 130 transmits the public key to the control server 3000. The private key is stored in a designated location. In this case, the private key may be encrypted with an encryption key of the encryptor 150, and the encrypted private key may be stored. The encryptor 150 may include a hardware security module (HSM).

The authentication key generator 130 generates the public key and the private key according to a key generating algorithm. The key generating algorithm may be an RSA key generating algorithm. Information which is received by the authentication key generator 130 at the time of generating the public key and the private key may be designed in various forms. For example, the authentication key generator 130 receives random number and generates the public key and the private key based on the random number. The authentication key generator 130 may generate the public key and the private key based on the biometric (fingerprint) information. Alternatively, the authentication key generator 130 may generate the public key and the private key based on the biometric information and additional identification information. There may be various additional identification information. The additional identification information may be identification information (for example, a serial number) of the authentication device 100 or device related identification information such as identification information of specific hardware included in the authentication device 100. For example, the identification information of the specific hardware may be sensor identification information (sensor_id) of the biometric information detector 110. The additional identification information may be user-related identification information such as a user password, a resident registration number (Social Security number), and the like. Further, the additional identification information may be a combination of the device-related identification information and the user-related identification information.

The encryptor 150 may include hardware security module to encrypt input data with an encryption key. The encryption key may be used to encrypt/decode the private key. The encryptor 150 may encrypt the input data using an Advanced Encryption Standard (AES) encryption algorithm.

The login controller 190 may receive a list (white list) of fingerprint login sites which support the biometric information based login from the control server 3000. The login controller 190 may periodically access the control server 3000 to update the fingerprint login site list or to receive the fingerprint login site list from the control server 3000. The fingerprint login site list may include various information (for example, a host name (Host), an IP address, URI, and the like) to identify the fingerprint login site list. Identification information (for example, 0001, 0002, and the like) may be provided to each fingerprint login site.

When the user accesses a specific website through a computing device 2000 or accesses the specific website to request a fingerprint login, the login controller 190 receives the fingerprint login request message transferred to the website server 4000 from the computing device 2000. Referring to FIG. 3, a menu button 10 for fingerprint login request may be displayed on a partial region of a login screen of the website.

The login controller 190 determines whether a website server 4000 is included in the fingerprint login site list based on destination in the fingerprint login request message. The packet transmitted to the website server 4000 from the computing device is transferred to the website server 4000 through a communication module of the authentication device 100. Accordingly, the login controller 190 may determine whether a website server 4000 is a fingerprint login site based on information (for example, a host of an HTTP protocol, a destination address, URI, and the like) in the fingerprint login request message.

When the website server 4000 is in the fingerprint login site list, the login controller 190 parses and stores a session key (for example, finger_login=flogin=ABCD) in the fingerprint login request message. The session key is randomly generated by the website server 4000 and transmitted to the computing device 2000. The session key is a session value specifying a session connection between the computing device 2000 and the website server 4000. In this case, a fingerprint login request message of the computing device 2000 is transferred to the website server 4000. The website server 4000 stores a session key and a cookie included in the fingerprint login request message.

The website server 4000 transmits a fingerprint confirmation request message through the session connection with the computing device 2000. The fingerprint confirmation request message is transmitted to the computing device 2000 through the authentication device 100, and the computing device 2000 may display a fingerprint request screen 20, as shown in FIG. 3.

The login controller 190 receives fingerprint information of a user from the biometric information detector 110 to authenticate the received fingerprint. Various fingerprint authentication methods may be provided. For example, the login controller 190 may compare the received fingerprint information with fingerprint information stored in the storage 170.

The login controller 190 transmits fingerprint authentication information of the session key to the control server 3000. In this case, the login controller 190 encrypts the fingerprint authentication information with a private key and transmits the encrypted fingerprint authentication information to the control server 3000. The finger authentication information includes data requested from the control server 3000. The requested data from the control server 3000 may include the session key associated with a fingerprint authentication result, the fingerprint authentication result (for example, 0 or 1) and website identification information.

The control server 3000 decodes, by a public key, the encrypted information with the private key, and determines authenticity of the received fingerprint authentication information based the decoding result. When the fingerprint authentication information is reliable information, the control server 3000 determines whether fingerprint authentication is successful based on the fingerprint authentication result in the fingerprint authentication information. When the fingerprint authentication is successful (there is a match), the control server 3000 identifies the website server 4000 based on the website identification information in the fingerprint authentication information, and requests login permission of a session corresponding to the session key to the website server 4000.

The website server 4000 allows login with respect to the session in which login permission is requested from the control server 3000. Accordingly, the computing device 2000 may access the website server 4000 to use login service.

As described above, according to an exemplary embodiment, if the website server 4000 receives a login permission (allowance) request from a reliable control server 3000, the website server 4000 allows the login of the login permitted session. Accordingly, as illustrated in FIG. 3, the website server 4000 only provides a menu 10 to select biometric information based login and a screen 20 to request the fingerprint information and report the fingerprint recognition result to the user. Then the website server 4000 just allows the login with respect to the login permission request received from the control server 3000. Accordingly, the website server 4000 is no need to perform a series of a procedure of storing fingerprint information and a public key of the user, receiving the fingerprint information encrypted with the private key of the user, and decoding the encrypted fingerprint information by the public key to authenticate. There is no demand to manage private information such as fingerprint information, which is sensitive security information.

Figure 4:
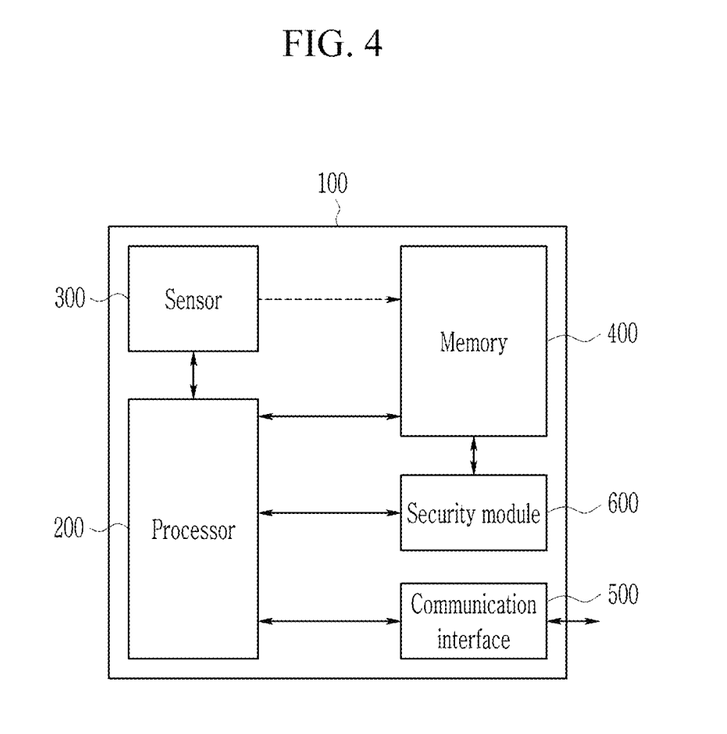
FIG. 4 is a block diagram illustrating a hardware configuration of the authentication device according to an exemplary embodiment.

FIG. 4 is a block diagram illustrating a hardware configuration of the authentication device according to an exemplary embodiment.

Referring to FIG. 4, various hardware configurations of the authentication device 100 may be provided according to a design. As shown in FIG. 4, the authentication device 100 may include a processor (CPU) 200, at least one sensor 300, at least one memory 400, at least one communication interface 500, and a security module 600.

The sensor 300 is a hardware which performs a function of the biometric information detector 110. When the authentication uses the fingerprint as biometric information, the sensor 300 may be a fingerprint sensor.

The memory 400 is a hardware which stores various information required for the operation of the processor 200. The memory 400 may stores an operating system (OS) for driving the processor 200 and a program for various operations of the authentication device 100 described in an exemplary embodiment. The memory 400 may perform at least a part of the function of the storage 170. It should be understood that the memory may be separately implemented according to data to be stored. That is, the memory 400 may store fingerprint information, a fingerprint login site list, a parsed session key, and the like. The information stored in the memory 400 may be updated or deleted after a predetermined period of time.

The communication interface 500 is hardware for physical connection with external devices. As illustrated with reference to FIG. 2, the communication interface 500 may include a communication interface for connection with the computing device 2000 and a wired/wireless communication interface for access to a communication network.

The security module 600 is hardware which performs a function of the encryption unit 150.

The processor 200 communicates with the sensor 300, memory 400, the communication interface 500, and the security module 600 and controls them. The processor 200 may load a program (for example, a program configured to implement an authentication information registration algorithm as well as a key generation algorithm, and a program for biometric information based login, and the like) stored in the memory 400 to perform functions of the authentication key generator 130 and the login controller 190.

When the processor 200 is requested to register authentication information (also it will be described to issue a certificate or generate the public key and the private key), the processor 200 loads a program associated with the registration of authentication information. The processor 200 generates the public key and the private key according to the key generation algorithm. The processor 200 transmits the public key to an authentication authority through the communication interface 500. Further, the processor 200 stores the private key. In this case, the processor 200 may transmit the private key to the security module 600 so that the security module 600 may encrypt the private key, and store the encrypted private key in a designated location (for example, in the security module 600). When the private key is needed for an electronic signature, the processor 200 may decode the private key based on the encryption key used for the encryption.

There may be various key generating algorithms such as an algorithm of generating a public key and a private key based on a random number, an algorithm of generating a public key and a private key including biometric (fingerprint) information, or an algorithm of generating a public key and a private key including biometric information and additional identification information.

The processor 200 detects a packet input and output to and from the computing device 2000. If the processor 200 detects a fingerprint login request message to be transmitted to the website server 4000 from the computing device 2000, the processor 200 recognizes a start of the biometric information based login request (for example, electronic signature) process. Accordingly, the processor 200 loads a program for biometric information based login to activate the sensor 300. To this end, the processor 200 previously stores the fingerprint login site received from the control server 3000. Moreover, the processor 200 determines whether the website server 4000 is the fingerprint login site based on the fingerprint login request message transmitted from the computing device 2000. If the website server 4000 is the fingerprint login site, the processor 200 parses a session key in the fingerprint login request message. The processor 200 performs fingerprint authentication based on the fingerprint information received from the sensor 300. The processor 200 encrypts the parsed session key and an authentication result with the private key, and transmits the encrypted session key and authentication result to the control server 3000.

Figure 5:
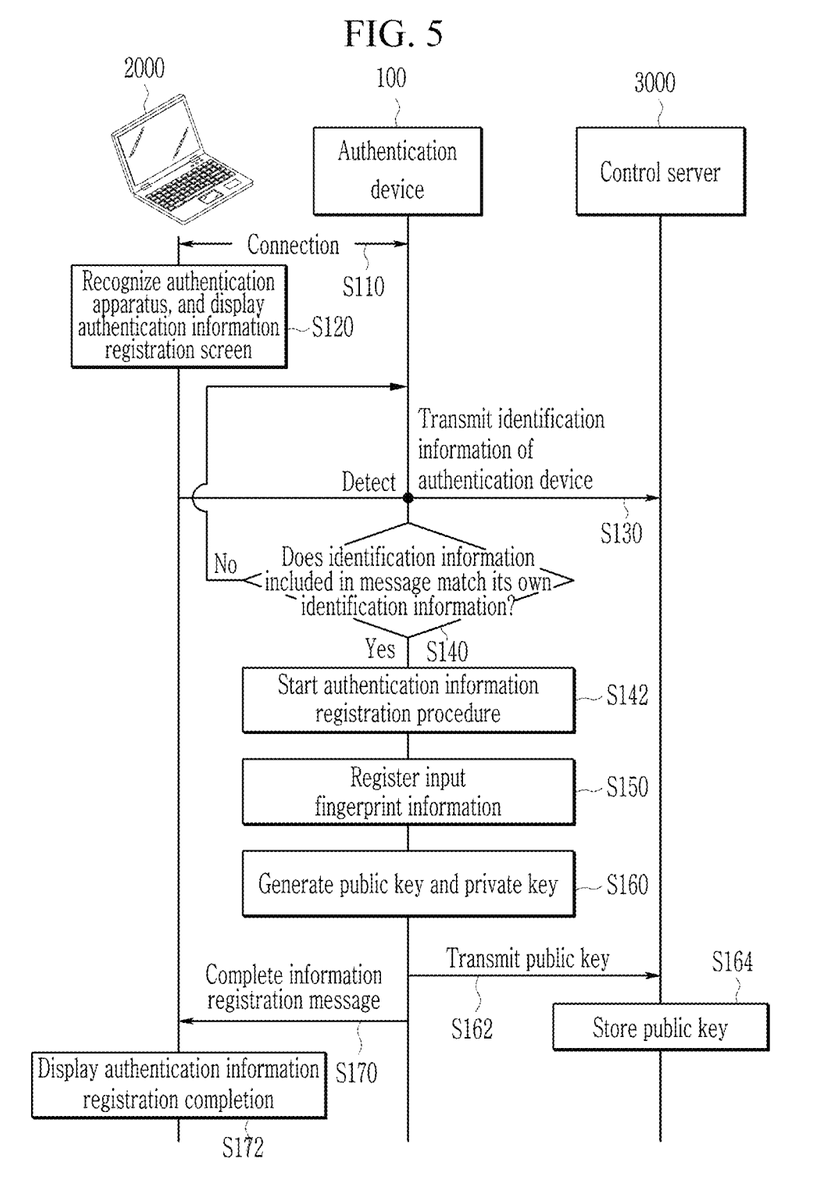
FIG. 5 is a flow diagram illustrating an authentication information registration method by the authentication device according to an exemplary embodiment.

FIG. 5 is a flow diagram illustrating an authentication information registration method by the authentication device according to an exemplary embodiment. According to an exemplary embodiment, the authentication information registration method is a method of generating a public key and a private key to register the public key in the control server 3000 after the fingerprint is stored, which is an initial setting operation for a biometric information based login.

Referring to FIG. 5, an authentication device 100 is connected with a computing device 2000 in operation S110.

The computing device 2000 recognizes the authentication device 100, and displays an authentication information registration screen in operation S120. The computing device 2000 drives a program associated with the authentication device 100, and communicates with the authentication device 100 to support an authentication information registration procedure. The computing device 2000 supports communication between the authentication device 100 and the user, and drives a program related to the authentication device 100 to provide a user interface screen. That is, the computing device 2000 may perform a guide (for example, fingerprint input request to the authentication device 100) required for the authentication information registration procedure to the user through a display screen. Particularly, the authentication information registration screen may request identification information, for example, serial information of the authentication device 100 in order to register the authentication device 100.

The computing device 2000 receives identification information of the authentication device 100, and transmits a message including identification information of the authentication device 100 to the control server 3000 in operation S130.

The authentication device 100 detects a message including identification information of the authentication device 100 to compare the identification information included in the message with its own identification information in operation S140.

When the identification information matches each other, the authentication device 100 recognizes the authentication information registration procedure and starts the authentication information registration procedure in operation S142. The authentication device 100 may activate the sensor.

The authentication device 100 receives user's fingerprint information and registers (stores) the received fingerprint information in operation S150. The authentication device 100 may receive the user's fingerprint information several times. When the fingerprint information is successfully received, a notification about the successful fingerprint input may be output through an alarm device (for example, an LED or a speaker) of the authentication device 100 or the notification of the successful fingerprint input may be displayed on the authentication device registration screen of the computing device 2000.

The authentication device 100 generates a public key and a private key after registering the fingerprint in operation S160. The authentication device 100 generates a public key and a private key based on a key generation algorithm. Even though the authentication device 100 may use a prime number P and a prime number Q including the fingerprint information as an input of the RSA key generating algorithm, the authentication device 100 may generate the public key and the private key in accordance with a normal RSA key generating algorithm.

The authentication device 100 transmits the public key to the control server 3000 in operation S162. The authentication device 100 stores the private key. The authentication device 100 may encrypt the private key with an encryption key and store the encrypted private key. The authentication device 100 may encrypt the private key based on an AES algorithm of an HSM to store the encrypted private key in the HSM.

A control server 3000 stores the public key in operation S164. In this case, the control server 3000 may store the public key by mapping the public key with the identification information of the authentication device 100.

The authentication device 100 transmits an authentication information registration completion message to the computing device 2000 in operation S170.

The computing device 2000 displays that the authentication information registration is completed on the authentication information registration screen in operation S172.

Figure 6:
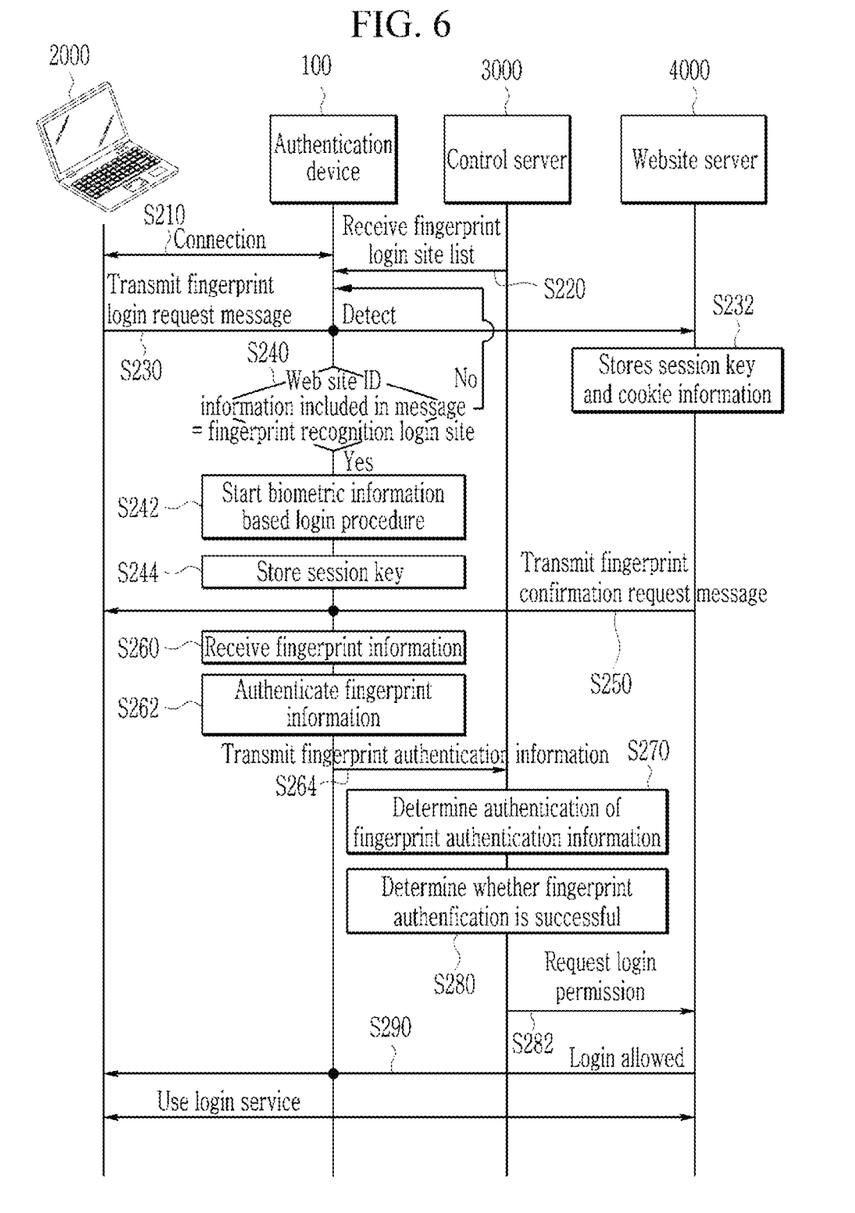
FIG. 6 is a flow diagram illustrating an information based login method according to an exemplary embodiment.

FIG. 6 is a flow diagram illustrating an information based login method according to an exemplary embodiment.

Referring to FIG. 6, an authentication device 100 is connected with a computing device 2000 in operation S210.

The authentication device 100 receives a fingerprint login site list (white list) from a control server 3000 in operation S220. The authentication device 100 may update the fingerprint login site list regardless of connection with the computing device 2000. For example, it is assumed that a specific website (www.kt.com/finger, flogin) is in the fingerprint login site list. Here, the flogin is defined as a session value (session key) identifying the session associated with a fingerprint login request.

If the user requests (selects) a fingerprint login provided by a specific website (www.kt.com/finger, flogin) in the computing device 2000, the computing device 2000 transmits a fingerprint login request message to the website server 4000 for the website (www.kt.com) in operation S230. The fingerprint login request message may include website identification information (for example, a host, a destination address, URI, and the like), a session key (flogin) and cookie. For example, it is assumed that the fingerprint login request message is "www.kt.com/finger?flogin=ABCD/cookie=1234".

The website server 4000 stores a session key (flogin=ABCD) and cookie information (cookie=1234) in the fingerprint login request message in operation S232.

The authentication device 100 detects the fingerprint login request message to compare website identification information in the message with the fingerprint login site list in operation S240. The authentication device 100 extracts a Host from the fingerprint login request message using a message detection function (Intrusion Detection system, IDS), which the fingerprint login request message is transmitted through a HTTP protocol. The authentication device 100 determines whether the extracted Host is included in the fingerprint login site list. When the extracted Host is in the fingerprint login site list, the authentication device 100 extracts a destination address from the fingerprint login request message and determines whether the extracted destination address is in the fingerprint login site list. When the destination address is in the fingerprint login site list, the authentication device 100 extracts URI from the fingerprint login request message and determines whether the extracted URI is in the fingerprint login site list.

When the website included in the message corresponds to the fingerprint login site, the authentication device 100 recognizes a biometric information based login procedure and starts the biometric information based login procedure in operation S242. The authentication device 100 may activate a sensor.

The authentication device 100 parses a session key (flogin=ABCD) from the fingerprint login request message to store the session key in operation S244.

The website server 4000 transmits a fingerprint confirmation request message through the session connected with the computing device 2000 in operation S250. Next, the computing device 2000 may display the fingerprint confirmation request screen 20 such as the one shown in FIG. 3.

The authentication device 100 receives fingerprint information of a user in operation S260.

The authentication device 100 authenticates the received fingerprint information in operation S262. The authentication device 100 may compare the received fingerprint information with stored fingerprint information to authenticate the received fingerprint.

The authentication device 100 encrypts fingerprint authentication information of the fingerprint login request session with the private key and transmits the encrypted fingerprint authentication information to a control server 3000 in operation S264. The fingerprint authentication information includes data requested from the control server 3000, and particularly includes fingerprint authentication result (for example, 0 or 1) and login session information. The login session information may include a session key (for example, ABCD) indicating session information requesting the fingerprint login and the website identification information. In addition, the fingerprint authentication information may further include time information, identification information (for example, serial information) of the authentication device 100, a service code, and the like. The time information is used to prevent reuse of a message and is a hexadecimal number for reducing the number of digits. The service code is a function code used in the server. The fingerprint authentication information may further include a random key used for message encryption and decoding.

The control server 3000 determines authenticity of the received fingerprint authentication information based on the decoding result obtained by decoding the received authentication information into the public key in operation S270. Such as electronic signature related technology, authenticity of data electronically signed with the private key is determined by a public key.

When the fingerprint authentication information is reliable, the control server 3000 determines whether fingerprint authentication is successful based on authentication information in operation S280.

When the fingerprint authentication is successful, the control server 3000 requests login permission with respect to the session of the fingerprint authentication information to the website server 4000 in operation S282. That is, if the received fingerprint authentication information is transmitted by a user transmitting the public key, the control server 3000 trusts the fingerprint authentication information. If the fingerprint authentication result in the fingerprint authentication information is successful or authenticated (for example, 0), the control server 3000 identifies the website server 4000 corresponding to website identification information, and requests login permission (allowance) with respect to the session key (for example, ABCD) to the website server 4000.

The website server 4000 allows or permits login with respect to the login request session requested from the control server 3000 in operation S290. After that, the computing device 2000 may access the website server 4000 to use login service. Since the computing device 2000 transmits a login request message (or access request message) (for example, www.kt.com/cookie=1234) including cookie (cookie=1234) to the website server 4000, the website server 4000 may determine whether the login request (or the access request) is an allowed or permitted login session, based on the cookie (cookie=1234) mapped to the session key (ABCD) of the login allowed or permitted request session. In addition, if cookie of the allowed login session is in an access request message, the website server 4000 allows or permits login with respect to the access request message.

Next, a method of signing (encrypting) fingerprint authentication information with respect to a fingerprint login request session with a private key and transmitting the encrypted fingerprint authentication information to the control server 3000 by the authentication device 100 is described, according to an exemplary embodiment.

An electronic signature is electronic information attached to transmission data in order to confirm a signer and to provide an indicator that allows the signer to sign transmission data (document). The authentication device 100 attaches an electronic signature encrypting transmission data (document) with a private key to the transmission data (main text) to send the transmission data. If decoding result of the electronic signature using the public key corresponds to the transmission data (main text), a receiver authenticates that the received transmission data are transmitted by a user transmitting the public key.

The authentication device 100 may transmit a message including authentication information using a GET method of an HTTP protocol. It is assumed that the authentication information is transmission data (main text). The transmission data include [time, identification information (serial information) of the authentication, a service code, login session information, a fingerprint authentication result, and a random key]. For example, the login session information and the fingerprint authentication result include [session key: result of fingerprint authentication (success 0, failure 1): website identification information]. For example, the login session information and the fingerprint authentication result may be [ABCD:0:001].

The authentication device 100 encrypts and signs transmission data with a private key.

The authentication device 100 attaches signature information to the transmission data to transmit the transmission data to the control server 3000. The transmission data and the signature information may be encrypted and transmitted.

The control server 3000 determines whether a value obtained by decoding the signature information with a public key corresponds to the transmission data, and determines the authenticity of the transmission data.

As described above, according to an exemplary embodiment, the user may login to various websites through the biometric information based authentication device of the user. According to an exemplary embodiment, since the website provider determines presence of a user login based on the authentication result received from a network device in connection with the biometric information based authentication device, it is unnecessary to implement a separate program of the biometric information based login, and an ID theft problem due to hacking and the like may be solved.

An exemplary embodiment as described above is not implemented only by a method and an apparatus. However, the exemplary embodiment may be implemented through a program or a recording medium in which the program is recorded.

While exemplary embodiments have been described, it is to be understood that the present disclosure is not limited to exemplary embodiments, but, on the contrary, is intended to cover various modifications and equivalent arrangements included within the spirit and scope of the appended claims and their equivalents.

The invention claimed is:

1. A method of providing a login to a website requested from an electronic device, by a biometric information based authentication device which interworks with a control server, the method comprising:
   detecting a login request message that includes a website to be accessed transmitted from the electronic device to a website server providing the website;
   extracting login session information from the login request message;
   receiving a white list comprising information about a plurality of websites with registered biometric information corresponding to the login information, from the control server,
   based on a website included in the login request message corresponding to information in a white list:
      activating a sensor to start a bio information-based login process, which includes receiving biometric information from a user;
      determining an authentication result with respect to the received biometric information;
      outputting an authentication result with respect to the received biometric information; and
      transmitting authentication information comprising the login session information and the authentication result to the control server, wherein the extracting the login session information further comprises:
         based on the requested website being present in the white list, extracting a session key included in the loin request message as the login session information based on determining that the website server is included in the white list for access.

2. The login method of claim 1, wherein
   the login session information comprises the session key and identification information of the website, and
   the identification information of the website is included in the white list.

3. The login method of claim 1, wherein the bio information-based login process includes outputting the authentication result including comparing the received biometric information with stored biometric information, to output the authentication result.

4. The login method of claim 1, wherein
   the transmitting the authentication information to the control server comprises encrypting the authentication information with a private key to transmit the authentication information to the control server,
   the control server stores a public key which corresponds to the private key, and
   the public key and the private key are generated when the biometric information based authentication device is registered.

5. The login method of claim 1, further comprising registering the biometric information based authentication device before the detecting of the login request message, wherein the registering of the biometric information based authentication device comprises:

detecting first identification information transmitted to the control server from the electronic device;
determining whether the first identification information corresponds to identification information of the biometric information based authentication device;
activating the sensor when the first identification information corresponds to identification information of the biometric information based authentication device;
registering the biometric information received from the sensor; and
generating a public key and a private key based on a key generation algorithm.

6. A method comprising:
providing a login to a website requested from an electronic device, by a control server which interworks with a biometric information based authentication device, including:
detecting, by the biometric information based authentication device, a login request message that includes a website to be accessed transmitted from the electronic device to a website server providing the website;
extracting, by the biometric information based authentication device, login session information from the login request message, wherein the extracting the login session information further comprises: based on the requested website being present in the white list, extracting a session key included in the login request message as the login session information based on determining that the website server is included in the white list for access;
transmitting, by the control server, a white list comprising information about a plurality of websites with registered biometric information corresponding to login information to the biometric information based authentication device;
receiving, by the biometric information based authentication device, authentication information comprising login session information extracted from a login request message and a biometric information authentication result from the biometric information based authentication device, the biometric information authentication result indicating that a website included in the login request message corresponds to information in the white list and a sensor was used to successfully perform a bio information-based login process, which includes receiving biometric information from a user, determining an authentication result with respect to the received biometric information from a user, outputting an authentication result with respect to the received biometric information, and transmitting an authentication result with respect to the received biometric information; and
requesting login with respect to the login session information to a website server associated with the login session information.

7. The login method of claim 6, wherein
the login session information comprises the session key and identification information of the website,
the session key is a value identifying a session between the electronic device and the website server, and
the website is included in the white list.

8. The login method of claim 7, wherein the requesting the login comprises:
determining authenticity of the authentication information;
locating the website server corresponding to the identification information of the website included in the authentication information from the white list based on the authentication information being authentic and the biometric information authentication result being successful; and
requesting the login with respect to the session key to the website server.

9. The login method of claim 8, further comprising storing a public key received from the biometric information based authentication device, wherein
the determining the authenticity of the authentication information comprises decoding the authentication information using the public key to determine the authenticity of the authentication information based on a decoding result, and
the authentication information is encrypted with a private key which corresponds to the public key.

10. A biometric information based authentication device comprising:
at least one sensor configured to capture biometric information;
at least one communication interface configured to communicate with a plurality of external devices and a control server;
a memory that stores a program code; and
a processor configured to execute the program code, which causes the program code to:
detect a login request message that includes a website to be accessed transmitted from an electronic device to a website server providing the website,
extract login session information from the login request message;
based on a website included in the login request message corresponding to information in a white list;
activating a sensor to start a bio information-based login process, which includes receiving biometric information from a user;
determining an authentication result with respect to the received biometric information;
outputting an authentication result with respect to the received biometric information; and
transmitting authentication information comprising the login session information and the authentication result to the control server, wherein the extracting the login session information further comprises: based on the requested website being present in the white list, extracting a session key included in the login request message as the login session information based on determining that the website server is included in the white list for access.

11. The biometric information based authentication device of claim 10, wherein the program code when executed, further causes the processor to:
detect first identification information transmitted from the electronic device to the control server,
determine whether the first identification information corresponds to identification information of the authentication device to activate the sensor,
register second biometric information received from the sensor, generating a public key and a private key based on a key generation algorithm to transmit the public key to the control server,
encrypting the private key, and
storing the encrypted private key.

12. The biometric information based authentication device of claim 11, wherein the program code is further configured to cause the processor to:
compare the first biometric information with the second biometric information to obtain the biometric information authentication result,
decode the private key,
encrypt the biometric information authentication result and the login session information with the private key, and
control the at least one communication interface to transmit, to the control server, the encrypted biometric information authentication result and the encrypted login session information.

13. The biometric information based authentication device of claim 10, wherein
the memory further stores the registered biometric information,
the processor is further configured to: generate a public key and a private key based on a key generation algorithm, and transmit the public key to the control server, and
the biometric information authentication result is obtained by comparing the registered biometric information and biometric information acquired after detecting the login request message.

14. The biometric information based authentication device of claim 13, wherein the processor is further configured to:
parse a session key included in the login request message, based on determining that the website server is included in the white list, and
generate the login session information comprising the session key.

15. The biometric information based authentication device of claim 14, wherein the processor is further configured to:
confirm identification information of the website server, based on determining that the website server is included in the white list, and
generate the login session information so as to include the identification information of the website server.

16. The biometric information based authentication device of claim 13, wherein the processor is further configured to: encrypt the authentication information with the private key, and transmit the encrypted authentication information to the control server.

* * * * *